2,965,446
Patented Dec. 20, 1960

2,965,446
PRODUCTION OF BORIC ACID AND SODIUM NITRATE

Thomas M. Cramer, Carlsbad, N. Mex., assignor to United States Borax & Chemical Corporation, Los Angeles, Calif., a corporation of Nevada No Drawing. Filed July 16, 1958, Ser. No. 748,811

2 Claims. (Cl. 23—102)

This invention relates as indicated to the production of boric acid and sodium nitrate and has more particular reference to the production of boric acid from sodium borate using nitric acid as the acidifying agent.

There are many prior art methods for the preparation of boric acid. However, substantially all of them require some heating and cooling of solutions and separation of salts by fractional crystallization.

It is an object of this invention to provide a method for the production of boric acid which additionally provides valuable by-products.

A further object of this invention is to provide a method for the production of boric acid wherein the final products are easily and economically separated.

Other objects of the invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated this invention comprises the process of making boric acid and sodium nitrate which comprises making a mother liquor comprising a substantially saturated aqueous solution of boric acid, potassium nitrate and sodium nitrate at a temperature of at least about 75° F. and having a density of at least 1.5, slurrying sodium borate into said mother liquor, adding nitric acid until said slurry is from neutral to slightly alkaline to methyl orange indicator, whereby boric acid and sodium nitrate precipitate, cooling said slurry to the point where the mother liquor has a density no less than about 1.5, allowing the combined precipitates to separate in the mother liquor and separately removing said boric acid and sodium nitrate from said mother liquor.

Since the boric acid and sodium nitrate have different densities, any known method can be used to effect their separation in the mother liquor.

The amount of mother liquor and the amount of sodium borate slurried into the mother liquor can be varied to suit the capacities and characteristics of the processing apparatus. I prefer that the slurries should be kept thin enough to be easily mixed and pumped through pipelines. A typical example of such a slurry would comprise adding about 154 tons of sodium borate decahydrate and 51 tons of (100%) nitric acid or 73 tons of (70%) nitric acid to about 400 tons of mother liquor. This slurry produces about 100 tons of boric acid and 68.73 tons of sodium nitrate. However, the individual operator will know the total tonnage his equipment can handle and the thickness of slurry which he is able to pump through his processing apparatus.

I have found that a ratio of about 4 to 1 by weight of mother liquor to boric acid produced yields a slurry which can be readily pumped and handled easily in centrifugals. However, as stated above, the range in quantity of mother liquor can be adjusted to the particular conditions with no loss in efficiency as measured by recoveries.

All the sodium borates having varying degrees of water of hydration are applicable to the present invention. Those skilled in the art will readily realize that excess water will be produced from the reaction between a sodium borate such as borax ($Na_2B_4O_7 \cdot 10H_2O$) and 70% nitric acid. Such water produced will dilute the mother liquor and dissolved some of the boric acid and sodium nitrate produced and thus require additional potassium nitrate to make up for the dilution. While the quantity of boric acid dissolved is but a small fraction of the total produced, the amount of sodium nitrate going into or staying in solution is nearly 79% of that which comes from the reaction. This condition does not interfere with my present process; however, such a condition is not a satisfactory one for economical operation. It becomes obvious that any water of dilution can be evaporated; however, evaporation is a costly procedure. The excess water of reaction can be prevented from entering the process or can be reduced as desired by using borax ($Na_2B_4O_7 \cdot 10H_2O$) and 100% nitric acid, or sodium borate pentahydrate and 70% nitric acid, or sodium borate pentahydrate and 100% nitric acid, or, if desired, anhydrous sodium borate can be used with 70% or 100% nitric acid. I have found that when 154 tons of $$Na_2B_4O_7 \cdot 10H_2O$$

and 73 tons of 70% nitric acid are slurried into 400 tons of mother liquor that about 53.90 tons of sodium nitrate and 5.50 tons of boric acid are dissolved and it would require about 31.60 tons of potassium nitrate to make up for dilution. The following table illustrates that by varying the materials used the amount of boric acid and sodium nitrate going into solution can be controlled.

|  | $Na_2B_4O_7 \cdot 10H_2O$ plus 70% $HNO_3$ | $Na_2B_4O_7 \cdot 10H_2O$ plus 100% $HNO_3$ | $Na_2B_4O_7 \cdot 5H_2O$ plus 70% $HNO_3$ | $Na_2B_4O_7 \cdot 5H_2O$ plus 100% $HNO_3$ |
|---|---|---|---|---|
| $H_3BO_3$ remaining in solution | 5.55 | 3.47 | 2.08 | 0.00 |
| $NaNO_3$ remaining in solution | 53.90 | 33.70 | 20.20 | 0.00 |
| $KNO_3$ to be added | 31.60 | 19.70 | 11.80 | 0.00 |

In the present process nitric acid is added to the slurry until the slurry is brought to a point of being from neutral to slightly alkaline to methyl orange indicator.

Since methyl orange is a well-known indicator covering a pH range of from 3.1 to 4.4 it is clearly intended in the present specification and claims that the addition of nitric acid is stopped at the point or just before the methyl orange indicator changes from a yellow color or in other words when a pH of from about 3.1 to about 4.4 is reached. The indicator is used in the well-known and accepted manner, that is, a drop or two of indicator is added to slurry liquor which has been diluted about 10 to one with water and while the color still remains yellow the addition of the nitric acid is stopped. An over-run of nitric acid is readily corrected by the addition of some sodium borate.

The mother liquor from which boric acid and sodium nitrate are produced, as previously stated, is a saturated aqueous solution of $H_3BO_3$, $NaNO_3$ and $KNO_3$ made at about atmospheric temperature. When the sodium borate is slurried into the mother liquor and the nitric acid added the reaction is exothermic and a slight rise in temperature occurs. 1 cool the resultant mass back to about atmospheric temperature or the temperature of the liquors circulating in the rest of the process. In the preferred embodiment of my invention the process is operated at a temperature which is maintained without addition or extraction of heat from the general cycle. Such a condition is known as atmospheric temperature and often referred to as "room temperature." I have found that about 77°–87° F. is a satisfactory temperature range for the precipitation of boric acid and sodium nitrate. However, it is to be clearly understood that the cooling can be carried below the existing atmospheric temperature. The important factor being the temperature must not drop below the point where liquor densities will fail to float the boric acid. The present process is based upon the fact that boric acid has a density of about 1.49, whereas a solution saturated with both sodium and potassium nitrates at about 86° F. has a density above 1.49. Thus a liquor density of 1.5 or higher must be maintained. Since sodium nitrate has a density about 2.26 it will sink. Putting a liquor containing such combined precipitates in a cenrifugal affords an easy and economical separation.

My present process lends itself ideally to the continuous production of boric acid and sodium nitrate. The following example is given for illustrative purposes:

Example 400 tons of a saturated aqueous solution of $H_3BO_3$, $NaNO_3$ and $KNO_3$ is prepared at about 86° F. in a tank with rotating paddles. 154.19 tons of $Na_2B_4O_7 \cdot 10H_2O$ is slurried into the tank with 50.95 tons of 100% $HNO_3$. The pH of the slurry is checked with methyl orange indicator to be sure it is neutral to slightly alkaline to the indictator. The resultant mass is cooled to about 86° F. and passed through a centrifuge. The sodium nitrate is recovered from the centrifuge as a wet cake and the boric acid is recovered from the slurry on a filter. The liquor is recycled for further production of $H_3BO_3$ and $NaNO_3$ and if desired the recovered $H_3BO_3$ and $NaNO_3$ are delivered for further refining in the conventional manner.

Variations in the present process may be made to suit particular conditions. For instance, the process may be carried out in a mother liquor saturated only with boric acid and sodium nitrate. The precipitated mixed salts can be removed as by filtration or centrifuging, washed, suspended in a solution having a density of at least about 1.5 and then physically separated as disclosed above. Since this latter process does not use potassium nitrate it would be necessary to eliminate water of reaction so as to avoid unnecessary dilution of the mother liquor. Thus the reaction would be carried out with dehydrated sodium borate and preferably 100% nitric acid.

The neutralization of sodium borate can take place in a mother liquor saturated with $NaNO_3$ and $H_3BO_3$ or in a mother liquor saturated with $NaNO_3$, $KNO_3$ and $H_3BO_3$. One advantage in using a mother liquor saturated only with $H_3BO_3$ and $NaNO_3$ is that since the salts are to be separated in a dense liquor separate from the mother liquor the mother liquor can be cooled below the point where liquor densities fail to float the boric acid. Since lower temperatures produce more precipitation, and the circulating mother liquor contains less soluble materials, a higher yield of product per cycle can be more readily obtained. However, as noted above, this necessitates an extra filtration or centrifuging step.

From the foregoing description it will be seen that I have provided a process for producing boric acid and sodium nitrate which eliminates heating and cooling of solutions and the separation of salts by tedious and expensive fractional crystallization.

Other modes of applying the principle of the invention may be employed, change being made as regards the details described, provided the features stated in any of the following claims or the equivalent of such be employed.

I, therefore, particularly point out and distinctly claim as my invention:

1. The method of producing boric acid and sodium nitrate which comprises making at a temperature of at least about 75° F. a mother liquor comprising a substantially saturated aqueous solution of boric acid potassium nitrate and sodium nitrate, said mother liquor having a density of at least about 1.5, slurrying sodium borate into said mother liquor, adding nitric acid of at least about 70% concentration until said slurry is from neutral to slightly alkaline to methyl orange indicator, cooling said slurry to the point where the mother liquor has a density no less than about 1.5, allowing the combined precipitates to separate in the mother liquor and separately removing said boric acid and sodium nitrate from said mother liquor.

2. The method of producing boric acid and sodium nitrate which comprises making at a temperature of at least about 75° F. a mother liquor comprising a substantially saturated aqueous solution of boric acid, potassium nitrate and sodium nitrate, said mother liquor having a density of at least about 1.5, slurrying sodium borate into said mother liquor, adding nitric acid of at least about 70% concentration until said slurry is from neutral to slightly alkaline to methyl orange indicator, whereby boric acid and sodium nitrate precipitate cooling said slurry to about atmospheric temperature, centrifuging said liquor and combined precipitate, whereby the boric acid and sodium nitrate are separated in the mother liquor and separately removing the boric acid and sodium nitrate from said mother liquor.

References Cited in the file of this patent

UNITED STATES PATENTS

| 1,430,293 | Eddy | Sept. 26, 1922 |
| 2,422,657 | Cleveland | June 24, 1947 |

FOREIGN PATENTS

| 5,898 | Chile | Jan. 1927 |